US006773306B2

United States Patent
Plishner

(10) Patent No.: US 6,773,306 B2
(45) Date of Patent: Aug. 10, 2004

(54) CONNECTOR HAVING INTEGRATED CIRCUITS EMBEDDED IN THE CONNECTOR BODY FOR MAKING THE CONNECTOR A DYNAMIC COMPONENT OF AN ELECTRICAL SYSTEM HAVING SECTIONS CONNECTED BY THE CONNECTOR

(76) Inventor: Paul J. Plishner, 42 Foster Crossing, Southampton, NY (US) 11968

( * ) Notice: Subject to any disclaimer, the term of this patent is extended or adjusted under 35 U.S.C. 154(b) by 0 days.

(21) Appl. No.: 10/345,083

(22) Filed: Jan. 15, 2003

(65) Prior Publication Data

US 2004/0132337 A1 Jul. 8, 2004

Related U.S. Application Data

(60) Provisional application No. 60/438,207, filed on Jan. 6, 2003.

(51) Int. Cl.[7] .............................................. H01R 13/66
(52) U.S. Cl. ....................................... 439/620; 324/754
(58) Field of Search ........................ 439/620, 488–491, 439/668, 669; 324/158.1, 754

(56) References Cited

U.S. PATENT DOCUMENTS 3,154,360 A    10/1964  Plishner
4,161,692 A  *  7/1979  Tarzwell ..................... 324/754
5,006,793 A  *  4/1991  Gleason et al. ............. 324/754
5,692,925 A  * 12/1997  Bogese, II .................. 439/620
5,977,773 A    11/1999  Medelius et al.
6,354,865 B1 *  3/2002  Bogese ....................... 439/418
6,416,334 B1    7/2002  Plishner

OTHER PUBLICATIONS

Dec. 2002 issue of Microwave Journal, advertisement in.
Dec. 2002 issue of Microwave Products Digest, advertisement in.
Dec. 2002 issue of Maritime Reporter, advertisement in.
Estimated Dec. 2002 issue of Microwave Products Digest, advertisement in.

* cited by examiner

Primary Examiner—Gary Paumen
(74) Attorney, Agent, or Firm—Ware, Fressola, Van Der Sluys & Adolphson LLP

(57) ABSTRACT

A connector (100 100*a*) for connecting conductors (23 23*a*) of electrical or optical signals, the connector (100 100*a*) including as a component thereof an embedded integrated circuit (200 200*a*) for performing a function having to do with either signals being conveyed across the connector or having to do with the connection itself, with active components of the embedded integrated circuit drawing power either from the power propagating along the conductors (23 23*a*) through the connector (100 100*a*), via a battery (210) included in the connector (100 100*a*), or via supply voltage lines (230). The integrated circuit/chip (200 200*a*) can be electrical, optical, optoelectronic, or quantum.

20 Claims, 6 Drawing Sheets

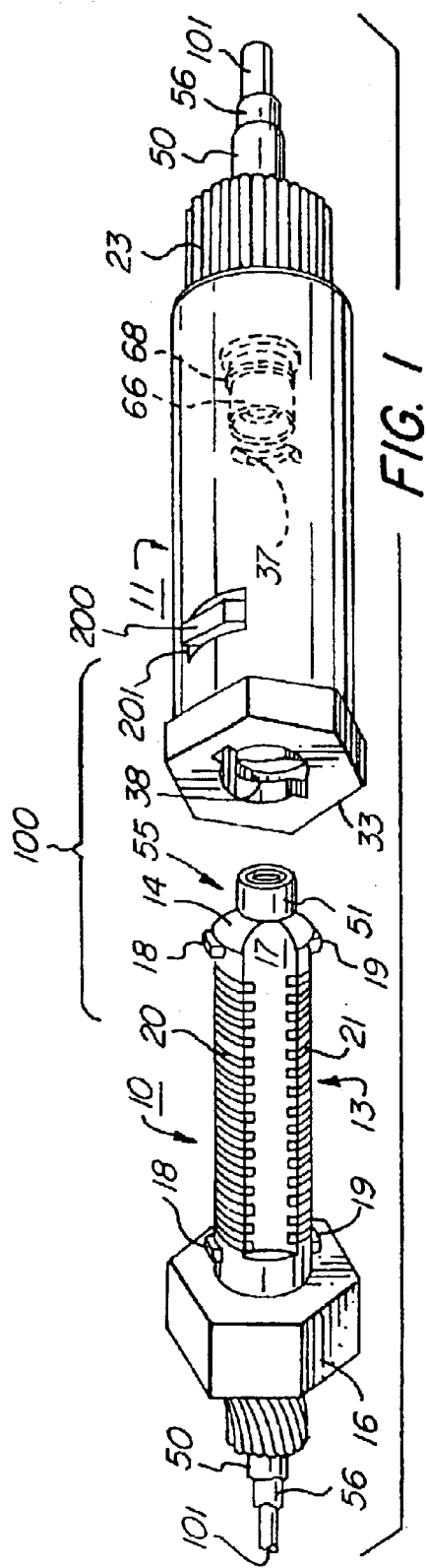
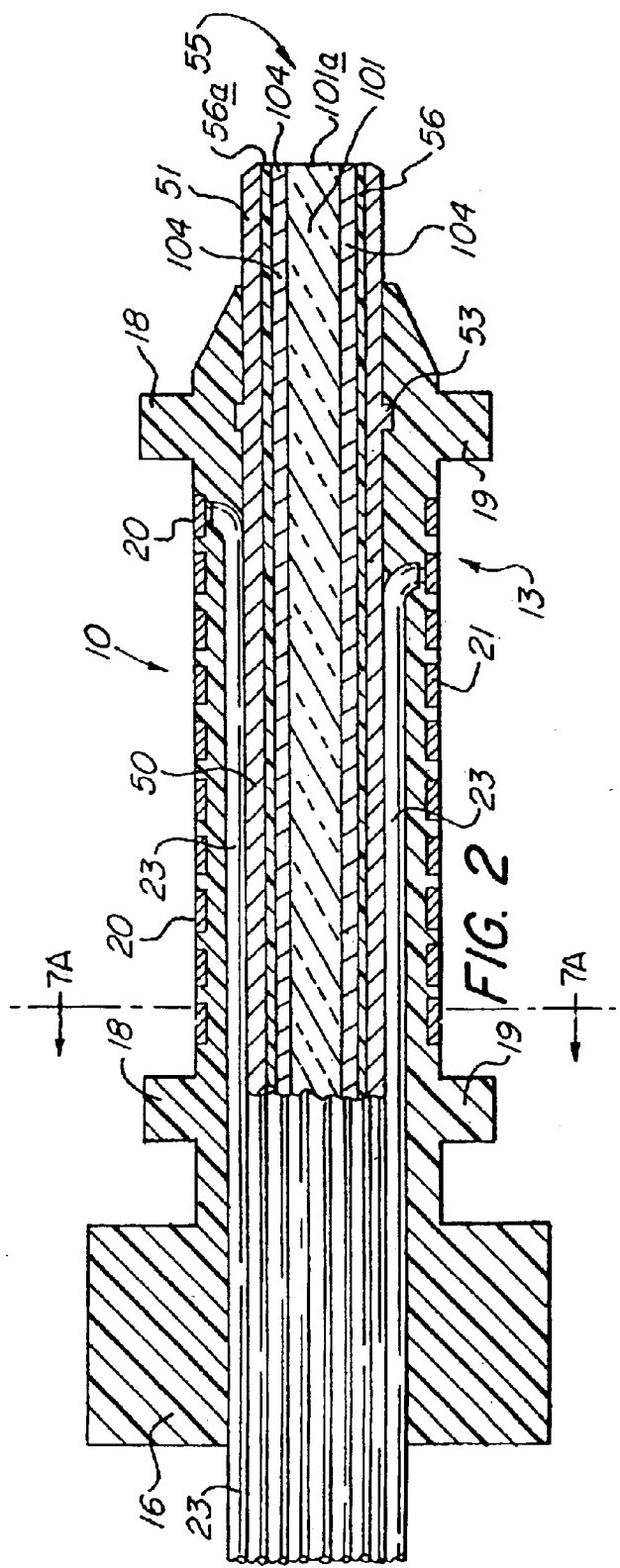

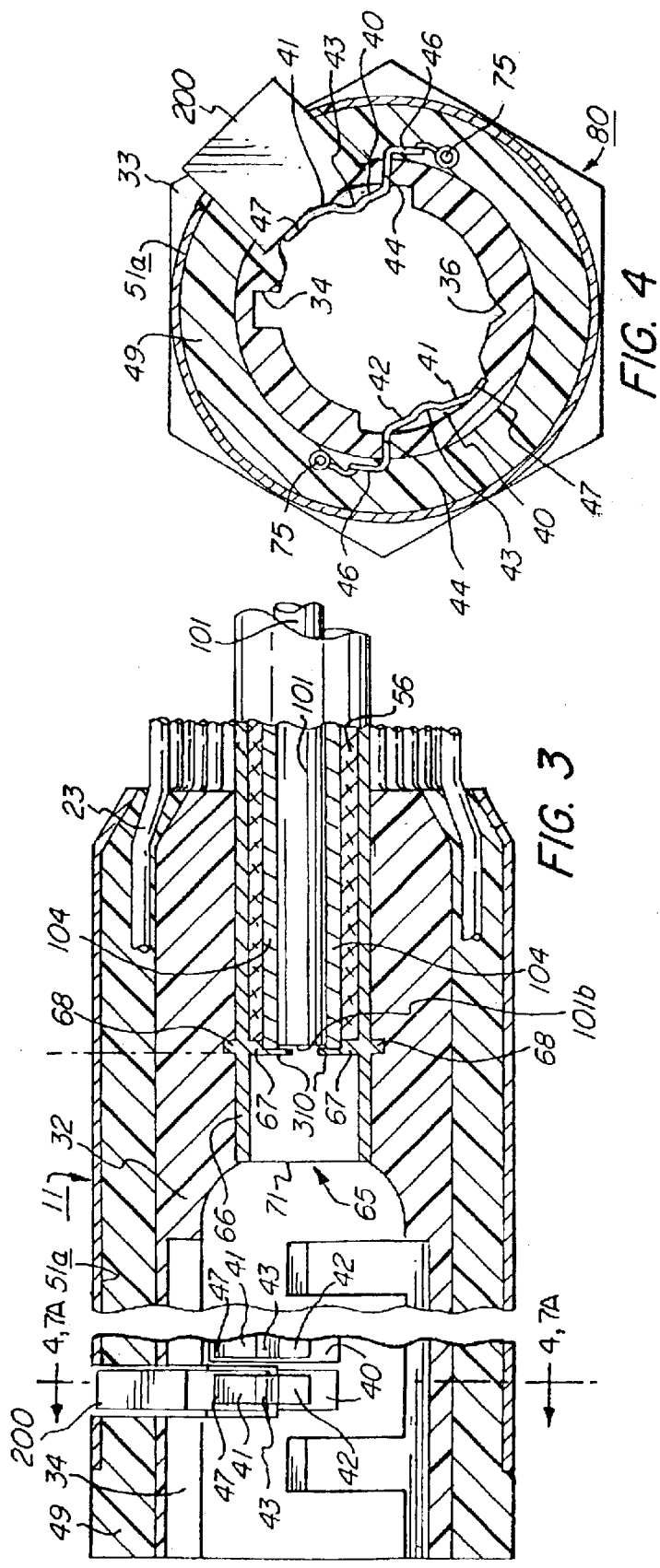
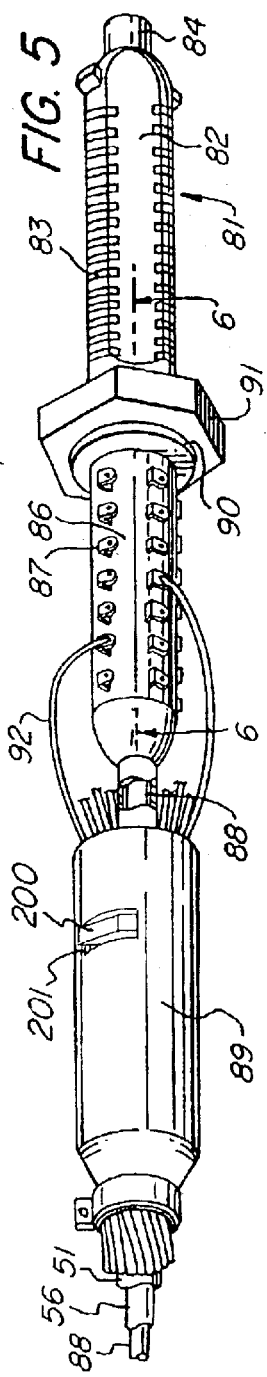
FIG. 4
FIG. 3
FIG. 5

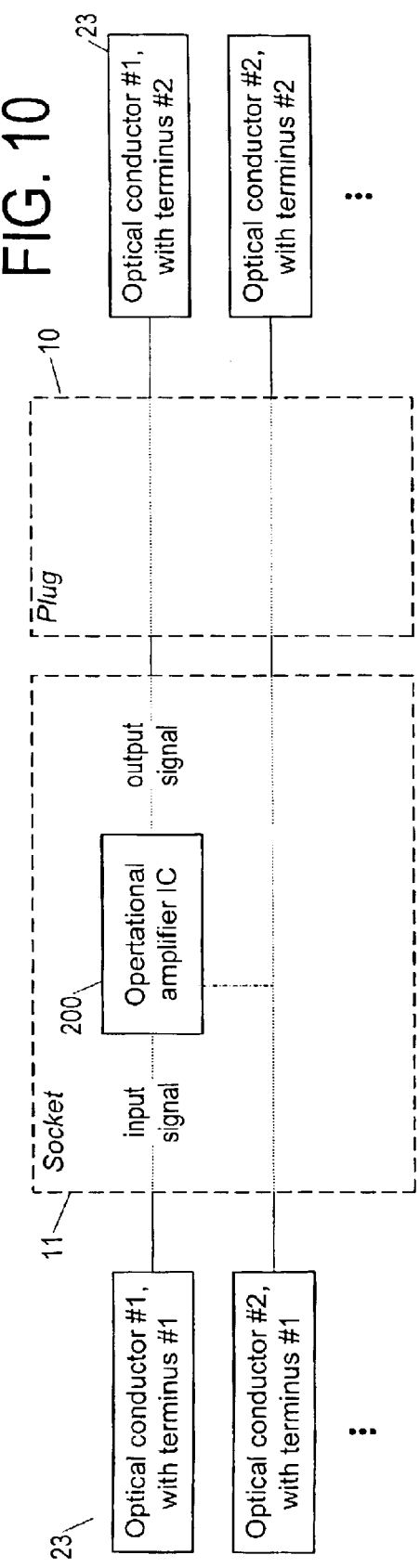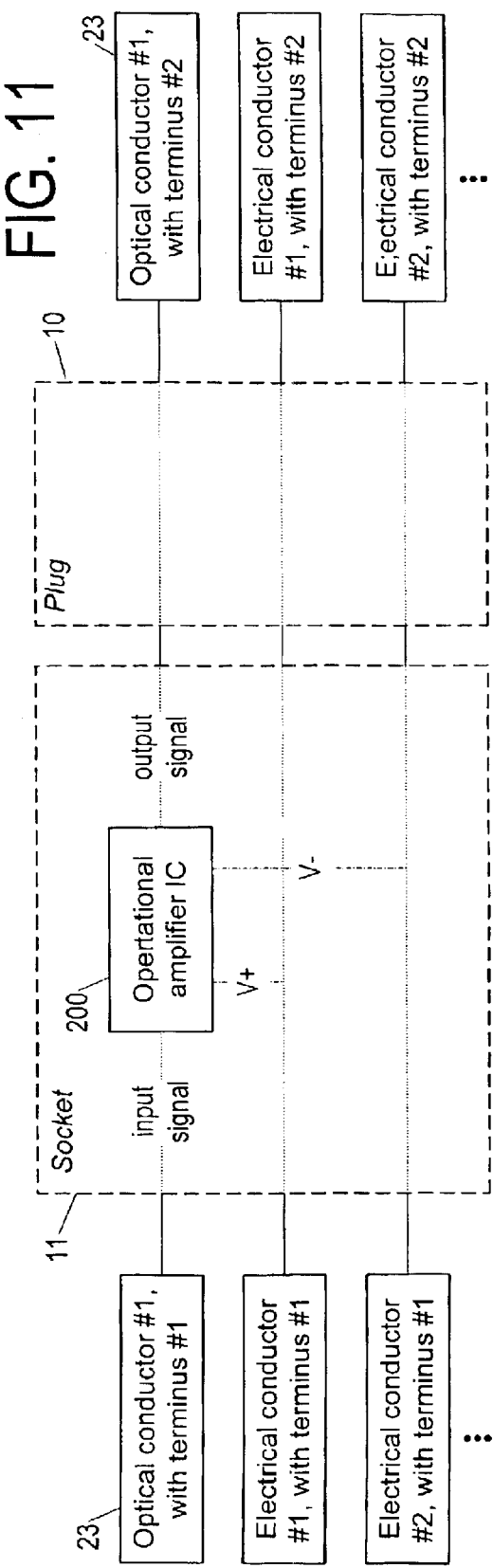

CONNECTOR HAVING INTEGRATED CIRCUITS EMBEDDED IN THE CONNECTOR BODY FOR MAKING THE CONNECTOR A DYNAMIC COMPONENT OF AN ELECTRICAL SYSTEM HAVING SECTIONS CONNECTED BY THE CONNECTOR

RELATED APPLICATIONS

Reference is made to and priority claimed from U.S. provisional application Ser. No. 60/438,207 filed Jan. 6, 2003, entitled, CONNECTOR HAVING AN INTEGRATED CIRCUIT EMBEDDED IN THE CONNECTOR BODY FOR MAKING THE CONNECTOR A DYNAMIC COMPONENT OF AN ELECTRICAL SYSTEM HAVING SECTIONS CONNECTED BY THE CONNECTOR.

Reference is also made to and priority claimed from U.S. application Ser. No. 10/345,083, filed Jan. 15, 2003, also entitled, CONNECTOR HAVING AN INTEGRATED CIRCUIT EMBEDDED IN THE CONNECTOR BODY FOR MAKING THE CONNECTOR A DYNAMIC COMPONENT OF AN ELECTRICAL SYSTEM HAVING SECTIONS CONNECTED BY THE CONNECTOR.

The present invention is related to the following co-owned and co-filed U.S. application:

Ser. No. 10/345,077, entitled PLUG AND SOCKET HOLDER FOR REPLACEABLY HOLDING DIODE-BASED LIGHT SOURCES AND OTHER RADIATION SOURCES AND ALSO RECEIVERS, filed Jan. 15, 2003.

The subject matter of the related application is hereby incorporated by reference in its entirety.

FIELD OF THE INVENTION

The present invention pertains to the field of connectors for electrical and optical signal-bearing lines. More particularly, the present invention pertains to such connectors with embedded integrated circuits (ICs).

BACKGROUND OF THE INVENTION

The prior art provides many types of connectors for connecting electrical or optical conductors. In addition, multi-element electrical connectors for simultaneously connecting several low frequency (including DC) currents-carrying conductors (i.e. two electrical lines each including several current-carrying conductors) are well known in the art. The prior art further includes a multi-conductor/coaxial electrical connector for simultaneously connecting a multi-conductor and a coaxial cable. For example, U.S. Pat. No. 3,154,360 provides a plug member and a socket (receptacle) member. The prior art also includes connectors for connecting optical fibers, and even connectors for simultaneously connecting several low frequency current-carrying conductors (including DC) and also two or more ends of optical fiber, as disclosed in U.S. Pat. No. 6,416,334.

In addition, integrated circuits (ICs) are well known in the art; the prior art teaches providing integrated circuits (ICs) for performing numerous different functions. ICs are available for use as voltage or current amplifiers, for test and evaluation of circuits, for use as elements of computers, for control, for use in connection with optical circuits (e.g. for performing one or another task of an add/drop multiplexer in a wavelength division multiplex signal), and for providing numerous other useful functions.

In many applications in which two or more conductors of one or more types of signal are used, it is often necessary to perform one or another kind of function at the location where the conductors are connected. For example, it would be useful to provide impedance matching at the point at which two conductors are joined. In addition, it is often useful to amplify a signal at a connector, using either an analog signal amplifier or a digital signal amplifier, or in a purely analog application, provide for either current or voltage amplification. In other applications, other kinds of functions would advantageously be performed at the point of connection of two or more conductors or one or more types.

What is needed therefore is a connector providing not only for connection of two or more conductors or one or more types of conductor, but also providing useful functions having to do with either the signals being conveyed by the connectors, or with the connection itself (including, e.g. test and evaluation of the connection).

SUMMARY OF THE INVENTION

Accordingly, in a first aspect of the invention, a connector is provided, for connecting ends of at least one pair of conductors suitable for conveying an electrical, photonic, quantum or optical signal, characterized in that the connector also includes at least one embedded integrated circuit connected to at least one of the conductors.

In accord with the first aspect of the invention, the connector may be further characterized in that it may comprise: a first housing for receipt of at least a first of the conductors; a second housing for receipt of at least a second of the conductors; and means, formed within the first housing or the second housing, for receipt of the at least one integrated circuit and for connecting the integrated circuit to at least one of the conductors in at least one of the pairs of conductors; wherein the first housing and the second housing are adapted so as to mate one with the other and wherein the integrated circuit is embedded in either the first housing or the second housing.

Also in accord with the first aspect of the invention, the connector may be further characterized in that it may also include a battery serving as a source of supply voltage for the embedded integrated circuit.

Also in accord with the first aspect of the invention, the connector may be further characterized in that power for the embedded integrated circuit may provided by tapping at least one of the conductors.

Also in accord with the first aspect of the invention, the connector may be further characterized in that power for the embedded integrated circuit mat be provided by supply voltage lines terminated in the connector.

Also in accord with the first aspect of the invention, the embedded integrated circuit may be for example an amplifier, or an impedance matching circuit, or a test and evaluation circuit for testing connectivity through the connector, or may provide a repeater function for a digital signal.

Also in accord with the first aspect of the invention, the connector may include an indicator for displaying a signal indicating an output of the embedded integrated circuit.

Also in accord with the first aspect of the invention, the connector may be a splice.

Also in accord with the first aspect of the invention, the connector may have a plug end and a socket end to which respective ends of the at least one pair of conductors are attached, wherein the socket has an elongated longitudinally extending cavity formed therein as the inner surface of a shell, wherein the connector includes a plurality of longitudinally spaced mutually insulated first contact elements disposed within the cavity, wherein the plug slidably registers with the cavity between advanced and retracted positions and has a leading end directed toward the base of the cavity, wherein the connector also includes a plurality of longitudinally spaced, mutually insulated second contact elements disposed along the plug, means maintaining a predetermined angular orientation between the plug and socket during relative sliding thereof and permitting relative rotation thereof at the plug advanced position, the first and second contact elements being out of engagement at the predetermined angular orientation and in engagement upon rotation in a single predetermined sense from the predetermined angular orientation to a closed contact position. Further, the connector may also include an optical connector comprising separable engagable collar members and optical fiber lengths coaxial with and extending to the leading end of the plug and at the base of the cavity of the socket, the optical connector being in a coupled condition when the plug is in its cavity advanced position. Further still, one of the collar members may nest in the other of the collar members when the plug is in the advanced position. Also further still, the plug and socket may each further comprise an optical fiber retainer substantially cylindrical in form, the plug optical fiber retainer extending along the length of and terminating at the leading end of the plug, and the socket optical fiber retainer extending along the length of the socket to the base of the cavity, wherein each optical fiber retainer comprises resiliently pliable rails extending along the length of the optical fiber retainer, the rails so shaped and so positioned so as to exert a radial force tending to center and align the optical fiber lengths so as to be coaxial with the optical fiber retainers. Also further, the connector may also comprise a plurality of longitudinally aligned sets of the longitudinally spaced second contact elements and a corresponding plurality of longitudinally aligned sets of the first longitudinally spaced contact elements, wherein the peripheries of the sets of second contact elements are of arcuate configuration extending circumferentially of the plug for less than 360° and in a straight line, lengthwise of the connector. Still also further, the socket may include a well portion defined by a cylindrical wall formed in the shell, the inner surface thereof having longitudinally spaced recesses formed therein, the first contact elements being located in the recesses and normally projecting above the upper edges thereof and being resiliently inwardly urged by the second contact elements during engagement therewith, and including contacts connected to the first contact elements and projecting through the cylindrical wall. Even still also further, the orienting means may be defined by at least one longitudinally extending groove formed in one of the connector members and at least one slidably engaging protuberance mounted on the other of the members. Even still also further, the connector may also comprise mutually insulated leads disposed within the plug extending through its outer end and longitudinally along the outer face of the tubular strength member and connected to respective of the second contact elements. Still even still also further, the connector may also comprise a contact post affixed to and projecting rearwardly from the plug, the tubular strength member extending rearwardly through the contact post, a plurality of spaced terminal elements mounted on the contact post, and mutually insulated leads extending longitudinally along the outer face of the tubular strength member and connecting the terminal elements to respective of the second contact elements, wherein the integrated circuit is embedded in a housing slidably disposed to cover the insulator post.

And even still also further, the connector may also comprise separable engagable conductor collar members and conductor pin elements coaxial with and mounted at the leading end of the plug member and at the base of the cavity and defining a coaxial connector, the coaxial connector being in a coupled condition when the plug is in its cavity advanced position.

Thus, the invention provides for embedding integrated circuits into the body of a connector, either in a plug member or a socket member or integral with a splice, for making the connector a dynamic part of an electrical system having sections connected by the connector. Use of the connector body as a vehicle for system circuitry saves space and avoids long wiring and long transmission times, i.e. it provides a higher packing density of the electrical system or parts thereof.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a perspective view of a connector embodying the present invention and so including an embedded integrated circuit and also including a plug section and a socket section illustrated in an uncoupled condition;

FIG. 2 is a medial longitudinal sectional view of the plug section;

FIG. 3 is a fragmentary medial longitudinal sectional view of the socket section;

FIG. 4 is a sectional view taken along line 4—4 in FIG. 3;

FIG. 5 is an exploded perspective view of a modified form of a plug according to the invention, as an example of the use of the invention in any connector;

FIG. 10 is a block diagram of a connector having an integrated circuit inline with an optical conductor and powered by tapping another optical conductor; and FIG. 11 is a block diagram of a connector having an integrated circuit inline with an optical conductor as in FIG. 10, but powered by tapping two electrical conductors.

BEST MODE FOR CARRYING OUT THE INVENTION

The invention will now be described as a connector for simultaneously connecting several low frequency current-carrying (electrical) conductors (including DC) and also two or more ends of optical fiber (i.e. an optical conductor), and including an embedded operational amplifier type of integrated circuit (IC) for use in amplifying a voltage signal conveyed by one of the conductors. It should be understood, however, that the invention comprehends any kind of connector, including any kind of splice, with one or more of any type of IC embedded in it, not only operational amplifiers. Also, it should be understood that the terminology "embedded integrated circuit" is used here to encompass an integrated circuit electrically and also physically attached to or embedded in a connector so as to be a part of, or integral with, the connector, and also an integrated circuit actually buried in the material of the housing or casing of the connector. ICs that are, according to the invention, advantageously embedded in a connector include ICs for performing tasks in connection with the function of either an optical or an electrical circuit or optoelectronic chips—especially those now being developed to use so-called surface plasmon polaritons (SPPs), which are neither photons nor electrons but rely on both for their existence and bridge the gap between the two, i.e. make it possible for electrons and photons to interact meaningfully in a chip. Examples of ICs that are, according to the invention, advantageously embedded in a conductor are: voltage or current or signal amplifier ICs, ICs for test and evaluation of circuits, ICs for use as elements of computers, for control, for use as or in connection with add/drop multiplexers in a wavelength division multiplex signal, for use as optical logic gates, for use in impedance matching and in simple throughput signal amplification, for use as optical packet switches, for use as LED switches, for use as wavelength division multiplexers, for use as memory buffers, for use as analog to digital converters, for use as voltage regulators, for use as LED switches, for use as data traffic routers, for use as demultiplexers for crosstalk suppression, for use as optical parametric amplifiers, for use as optical clock for signal processing, ICs for use as repeaters for reading and recreating digital signals, and ICs for use in SPP switching.

Figure 6:
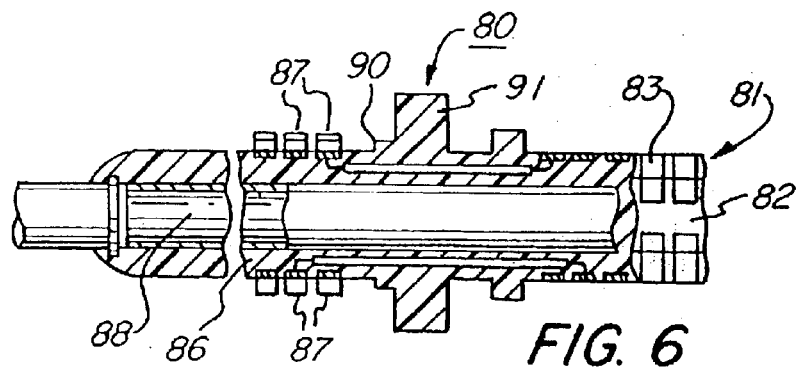
FIG. 6 is a fragmentary sectional view taken along line 6—6 in FIG. 5.
Figure 7A:
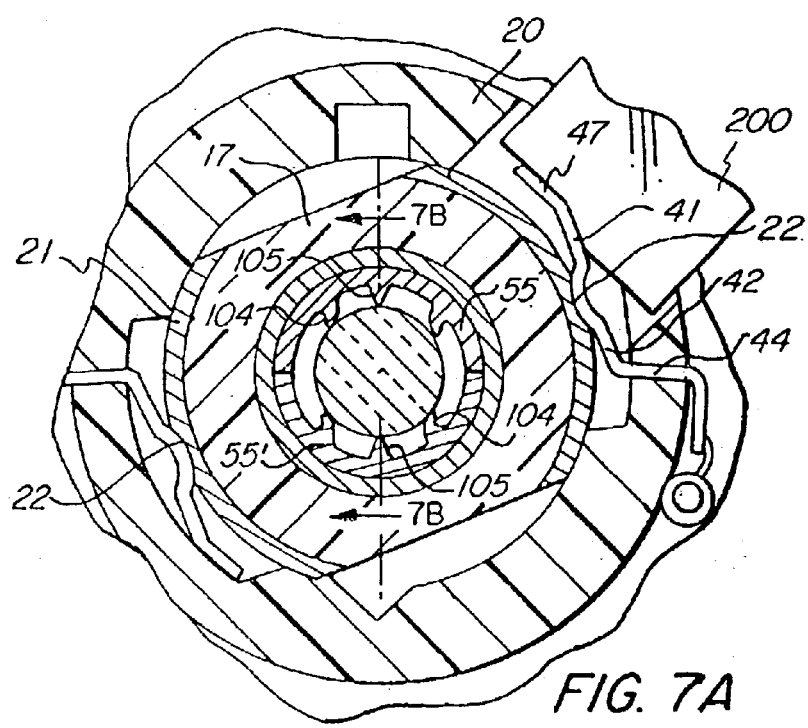
FIGS. 7A is a sectional view of an interconnected plug and socket, showing the optical fiber within the optical fiber retainer in the plug, and showing supporting and positioning retainer rails and forward directed teeth.
Figure 7B:
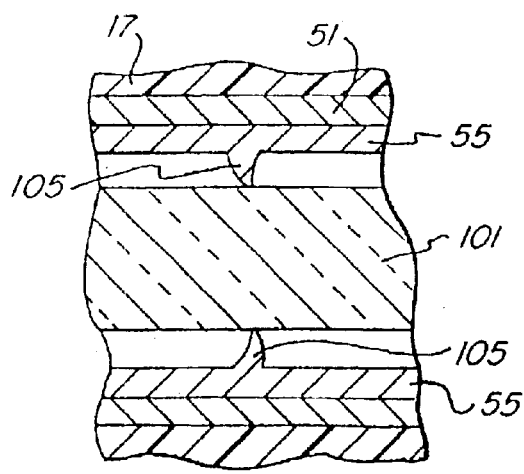
FIG. 7B is a sectional view taken along line 7B—7B in FIG. 7A
Figure 8:
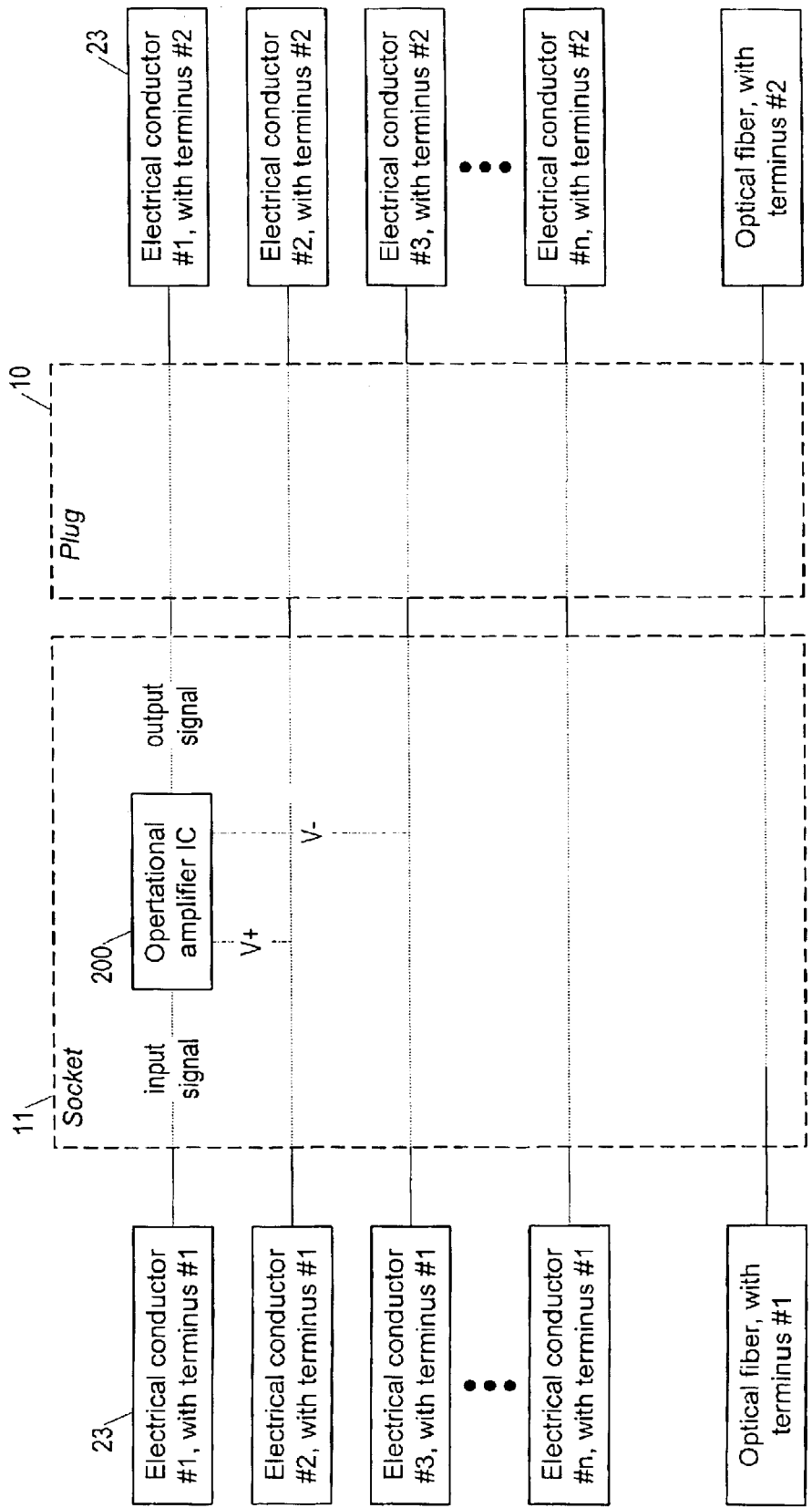
FIG. 8 is a block diagram of the connector shown in FIG. 1, showing the integrated circuit inline with an electrical connector having ends being connected by the connector.

Referring now to the drawings, and more particularly to FIGS. 1 to 4, 7A and 7B, and also FIG. 8, a connector demonstrating an especially advantageous embodiment of the invention is shown, including a plug 10 and a socket 11, with the socket 11 including an operational amplifier type of integrated circuit (IC) 200 in an opening 201 of the casing of the socket 11, through which the IC makes electrical contact with at least some of the conductors 23 having ends being joined by the connector, as shown in FIG. 6. The invention is to be understood to also encompass embedding an IC in the plug member of a connector having a plug member and a socket member, and also, in case of a splice connector (i.e. a permanent-type connection), having an IC integral with the splice connector. Thus, as mentioned, the connector shown in FIG. 1 is merely illustrative of the invention, although it is a preferred embodiment. The invention provides for use of any IC or solid state circuitry embedded in the body of any connector of any design or configuration.

The IC 200 is thus embedded in the connector 100 in that it is physically and electrically attached to the connector. Preferably, the IC 200 is actually buried in material of the socket 11, which is preferably a composite (insulator) material so as to be isolated from whatever environment the connector is used. Alternatively, the embedded IC 200 is disposed far enough into the casing or housing of the socket 11 so that a lid can close over it, covering the opening 201, and so making it easy to replace the IC in case it fails.

Plug 10 is formed of an insulating material such as thermoplastic or thermosetting resin and includes a longitudinally extending tubular shank 13 having a tapered frusto-conical leading end 14 and provided at its trailing end with an enlarged head 16, which defines a finger manipulating piece. Shank 13 is of substantially circular transverse cross-section and is provided with diametrically opposite longitudinally extending flat surfaces 17 extending from the tip 14 thereof to a point short of the head 16, flats 17 being closer to the axis of the shank 13 than the remaining arcuate (as in the arc of a bow) peripheral surface thereof.

Located on one of the arcuate surfaces of shank 13 adjacent tip end 14 are a pair of longitudinally spaced upright projections 18 having substantially parallel side walls, the forward projection being immediately posterior to the leading end 14 of the shank 13 and the rear projection being just forward of plug head 16. On the opposite arcuate surface of the shank 13 there may be located longitudinally spaced prismatic projections 19 which are diametrically opposite to the respective projections 18.

A set of longitudinally spaced and longitudinally aligned arcuate metal contact elements 20 are embedded in shank 13 along one of the arcuate peripheral surfaces thereof. The contact elements 20 extend circumferentially for less than 180° and their outer surface is coplanar with the arcuate peripheral surface of the shank 13 and their edges coplanar with flats 17. Another set of longitudinally spaced, longitudinally aligned arcuate contact elements 21 are provided, laterally aligned with the first set, the outer surfaces of elements 21 being coplanar with the arcuate surface of shank 13, the end edges of corresponding pairs of contact elements 20 and 21 being laterally spaced from each other. Formed in the outer surface of each of the contact elements 20 21 intermediate the ends thereof is an arcuate recess 22.

Connected to each of contact elements 20 and 21 is an insulator covered conductor 23, the end of which is soldered to a corresponding contact element, the conductors 23 being disposed along the inner peripheral base of shank 13 and extending longitudinally through the trailing end thereof.

Housed in and coaxial with shank 13 is a tubular strength member 50, preferably made of metal but also advantageously made from a hard plastic, which projects through the leading end of the shank 13, the insulated conductor 23 being sandwiched between the confronting faces of shank 13 and the tubular strength member 50. The leading end or section 51 of the tubular strength member 50 serves as a plug optical coupling member collar as described below and is delineated from the remainder of the tubular strength member 50 by inwardly and outwardly directed peripheral flanges respectively, flange 53 registering with a mating peripheral groove formed in the inner face of shank 13 to lock the strength member 50 against longitudinal movement.

The leading section 51 (FIG. 2) of the plug 10 defines the collar or sleeve of a plug optical coupling member 55 of an optical connector also including a mating socket optical coupling member 65 as described below, the plug optical coupling member 55 including an optical fiber retainer 56 with a leading end 56a. Retainer rails 104 (see especially FIGS. 7A and 7B), extend inward from the optical fiber retainer 56 and also extend longitudinally along the length of the retainer 56. An optical fiber 101 is located within and is coaxial with the optical fiber retainer 56, and terminates at the leading end 56a of the optical fiber retainer 56. Optical fiber 101 is supported in tube 50 by the optical fiber retainer 56 and the retainer rails 104, and also by teeth 105 (see especially FIGS. 7A and 7B) projecting inward and forward (in the direction of the leading end 56a). The teeth 105 prevent the optical fiber from backing into the plug 10, away from the leading end 56a.

The retainer rails 104 are made thin enough that they will give under pressure, as shown in FIG. 7B. The rails are preferably made of a soft metal (softer than the surface of the optical fiber) such as beryllium copper, so as to resiliently deform under pressure. The retainer rails 104 provide a radial centering force at four different but symmetrical places. The centering force tends to keep the optical fiber 101 centered in the optical fiber retainer 56. The optical fiber 101 is inserted into the plug 10 so that it slides along the retainer rails 104 until it protrudes slightly from the terminus of the plug 10, i.e. past the leading end 56*a* of the optical fiber retainer 56. The protruding optical fiber face is then ground flat and coplanar with the face of the optical fiber retainer leading end 56*a* and the leading end of the tubular strength member 50. The retainer rails 104 are also advantageously made of a plastic. The plastic is preferably one having a low coefficient of dynamic friction, allowing the optical fiber to be inserted into the plug 10 and pushed along the deformed rails until it reaches out past the leading end 56*a* of the optical fiber retainer 56. Alternatively, a plastic can be used in combination with a lubricant to allow inserting the optical fiber into the plug 10.

The socket 11 (see especially FIG. 3 and FIG. 4) includes a longitudinally extending inner shell 32 with interior surface defining a longitudinally extending cavity, the shell 32 preferably formed of an insulating plastic material in any well known manner and having at its trailing end an enlarged head 33 of hexagonal cross-section. A pair of oppositely disposed longitudinally extending grooves 34 and 36 respectively are formed in the inner face of the shell 32 and extend from the open trailing end thereof to a point short of the leading end. Groove 34 is of channel-shaped transverse cross-section corresponding in shape to the plug protuberance 18, and the groove 36 is of triangular transverse cross-section corresponding in shape to the plug protuberance 19, to permit sliding engagement between the corresponding grooves and plug protuberances and permitting sliding engagement between the plug and socket only at a predetermined orientation or polarization when the protuberances 18 and 19 register with the grooves 34 and 36. The relative sliding of the plug 10 and socket 11 is a non-shorting sliding in that the contacts of the plug do not touch the contacts of the socket during the sliding. (Of course instead of the plug member having protuberances and the socket member corresponding grooves, the protuberances and grooves can be on the other member of the connector, with the grooves in the plug disposed between the sets of contact elements 20 21.)

The grooves 34 and 36 (at their leading end) terminate in and communicate with circumferentially extending channel-shaped grooves as 37 (FIG. 1) extending approximately 9° clockwise as viewed forwardly from end 33. Also formed in the inner face of the shell 32 in the neighborhood of the head portion 33 (FIG. 4) are a pair of oppositely disposed channel-shaped circumferential grooves 38 extending clockwise from each of the longitudinal grooves 34 and 36 for approximately 90°. The longitudinal spacing between grooves 37 and 38 is equal to the longitudinal spacing between the plug protuberances 18 and 19. Thus, plug 10 may be inserted into socket 11 upon proper polarization, and following the full insertion of the plug within the socket, the plug may be rotated clockwise 90°, as viewed from the open end of the socket, the protuberances 18 and 19 engaging and locking in grooves 37 and 38.

Formed in the inner face of the inner shell 32 are two diametrically opposed longitudinal sets of circumferentially extending channel-shaped recesses 40 disposed between grooves 34 and 36. The center spacing between successive recesses 40 is substantially the same as the spacing between successive plug contact elements 20 or 21, and the recesses 40 of the opposite sets are laterally aligned. Disposed in each of recesses 40 is a contact element 41 formed of a resilient strip of metal. Each contact element 41 includes a curved section 42 having its convex portion directed inwardly towards the axis of shell 32 and provided with a centrally facing protuberance 43 adapted to engage recess 22 formed in the corresponding plug contact element 20 or 21. Radially projecting arm 44 extends from one end of the contact element curved portion 42 through the wall of inner shell 32 and terminates in a circumferentially extending contact (lug) 46 substantially superimposed upon the outer wall of inner shell 32. The free end of contact element curved portion 42 is oppositely bent, as at 47, and bears against the base of the corresponding recess 40. The crown of the contact element convex portion 42, as well as the protuberance 43, project inwardly of the inner cylindrical wall of the shell 32 when in normal unstressed condition. The contact elements 20 21 41 may be formed of any suitable conducting material such as brass or the like and are preferably electroplated in accordance with conventional practice with palladium or other suitable metal to provide greater corrosion- and abrasion-resistance and a better electrical contact surface.

The contacts 20 21 of the plug do not touch the contacts 41 of the socket during the sliding of the plug into the socket. Thus, as mentioned, the relative sliding of the plug 10 and socket 11 is a non-shorting sliding.

An intermediate cylindrical shell 49 (FIG. 3) is formed of an insulating material such as a plastic material, and may be integrally formed with the inner shell 32 or firmly adhered thereto. Contacts 46 of the contact elements 41 are embedded in the intermediate shell 49 and are connected to insulator covered conductors 75, which are also embedded in the intermediate shell 49 and extend longitudinally in the wall of the shell through the leading end thereof. It should be noted that the insulation covering 75 as well as that covering conductors 23 associated with the connector plug may be color-coded in the well-known manner. A tubular metal shell 51*a* (FIG. 4) tightly engages the intermediate shell 49, the leading edge thereof being inwardly inclined to engage the corresponding beveled surface of said intermediate shell, as in FIG. 3.

Embedded in the base or leading end of the shell 32 is the mate of the plug-carried optical coupling member 55 and includes a collar member 66, preferably made from metal for strength and resiliency. Located rearwardly of the base end of the collar 66 and formed integrally therewith are inwardly and outwardly directed peripheral flanges 67 and 68 respectively; flange 68 registering with a corresponding groove formed in shell 32. In addition, inwardly directed flange 67 has a further, thinner inwardly directed flange 310. Further inward flange 310 prevents inserting optical fiber 101 too far into socket 11 in the direction of the socket head 33 (FIG. 1).

Like the plug optical coupling member 55, the socket optical coupling member 65 also includes rails 104 and teeth 105 (see FIGS. 7A and 7B) projecting inward from an optical fiber retainer 56. In the case of the socket 11, the teeth 105 are directed toward the flanges 67 and 310 and so resist the optical fiber 101 from backing out of the socket once the optical fiber is inserted into the socket up to the innermost flange 310.

In coupling the plug and socket, plug 10 is aligned with and oriented relative to socket 11 so that the protuberances 18 and 19 engage the longitudinal grooves 34 and 36 respectively. As plug 10 is slid into socket 11, the flats 17 thereof confront the socket contact elements 41, whereas the plug contact elements 20 and 21 do not engage the contact elements 41 but merely slide along the inner surface of the insulating shell 32. When plug 10 is fully inserted in socket 11, the optical coupling member 55 is in engagement with the optical coupling member 65 and rotatable relative thereto. The optical fiber plug terminus 101a (see FIG. 2) is in near contacting registry with the optical fiber socket terminus 101b and collar 51 is in nesting contact with collar 66.

In order to effect engagement between the contact plug elements 20 and 21 and the socket contact elements 41, the plug is rotated clockwise, as seen in FIG. 7A. In this latter position, the plug and socket are in coupled contact closed position. As plug 10 is rotated relative to socket 11, the plug contact elements are conveyed along the socket contact elements 41 resiliently urging the latter forwardly until the contact recesses 22 are in registry with the contact protuberances 43, in which position the plug and socket are in contact closed position.

The reverse procedure is followed in effecting a contact open position and subsequently uncoupling the plug from the socket.

Instead of including in the connector 100 an optical coupling member 55 65 for coupling optical fibers, a coaxial connector can be included for coupling coaxial cables bearing radiofrequency (RF) signals, as shown and described in U.S. Pat. No. 3,154,360, entitled MULTI-CONDUCTOR COAXIAL ELECTRICAL CONNECTOR, issued Oct. 27, 1964, hereby incorporated by reference in its entirety. In such an embodiment, the connector 100 includes separable engagable conductor collar members and conductor pin elements coaxial with and mounted at the leading end of the plug 10 and at the base of the cavity and defining a coaxial connector, which is then in a coupled condition when the plug 10 is in its cavity advanced position within the socket 11. It is of course also possible to include within the connector 100 a plurality of RF or optical couplers for connecting a plurality of respective ends of pairs of RF and optical conductors as well as impedance-matching ICs.

In FIGS. 5 and 6 of the drawing, there is illustrated another embodiment of the present invention differing from that above described primarily in that a contact post 86 is provided on a plug 80 for facilitating connections thereto, it being understood that such expedient may be employed with the socket 11 shown in FIG. 1. In the embodiment shown in FIGS. 5 and 6, plug 80 includes the IC 200 in an opening 201 of a housing 89 for the contact post 86 (an IC that may be instead of or in addition to an IC embedded in the mating socket), and comprises a leading coupling section 81 similar in construction to plug 10 as above described, including a shank 82 carrying the contact elements 83 and an optical coupling member 84 in the manner earlier described. Coaxial with and projecting rearwardly from the trailing head end of the shank 82 is a tubular contact post 86, along the length of which is mounted a plurality of longitudinally and circumferentially spaced metal connector ears or contacts 87 provided with arms projecting through the wall of the contact post 86 into the interior thereof. Each of the contact elements 83 is electrically connected to a respective contact 87 by a corresponding conductor extending along the interior of shank 82 and contact post 86. An optical fiber 88 extends through contact post 86 and out its trailing end, and is connected to the optical coupling member 84 in the manner earlier described.

As shown in FIG. 5 and described above, it is here reemphasized that the embodiment of a plug member as shown in FIGS. 5 and 6 is one in which providing one or more ICs in the plug member instead of or in addition to providing ICs in the socket member is especially attractive; as shown in FIG. 5, an IC 200 is preferably embedded in the plug member 80 over the contact post 86 in the tubular housing 89.

The housing 89 for the contact post 86 is open-ended and tubular and has at least its inner face formed of an insulating material; it is slidable over contact post 86 with its peripheral wall radially spaced therefrom the leading inner border of the housing 89 separably snugly engaging an annular shoulder 90 formed on the trailing face of the plug head 91. Insulation covered conductors 92 have their ends soldered or otherwise connected to corresponding contacts 87 and together with the coaxial cable 88 extend through the trailing opening of the housing 89 and are connected as desired. Plug 80 may be employed with socket 11 as earlier described or with a socket modified in the manner of plug 80.

It is sometimes advantageous to plate the plug optical fiber face 101a and socket optical fiber face 101b using a thin layer of chromium, preferably 0.00025 inch. In such an embodiment, the closest approach of the two faces 101a and 101b of optical fiber is 0.0005 inch. In the preferred embodiment, however, the optical fiber faces 101a and 101b are not plated, because they do not actually abut since they are kept slightly separated by the thin inner flange 310 in the plug 11. In other embodiments where the optical fiber faces 101a and 101b would otherwise actually abut, using a thin plating of chromium (approximately 0.00025 inch on each face) will prevent cracking and spalling of the optical fibers being joined.

It is clear from the drawings and corresponding description that the present invention also comprehends a connector for simultaneously connecting a multi-conductor and not just a single optical fiber, but also several optical fibers. In such an embodiment, one optical fiber connection (i.e. both the plug and socket components for connecting two lengths of optical fiber) would act as a key for aligning the other optical fiber connections. In some applications, such a key optical fiber connection could be coaxial with the overall plug and socket. In other applications of the multi-conductor and multi-optical connector embodiment, the key optical fiber connection could be offset from the center of the plug. For example, in case of a connector for connecting two pairs of optical fiber lengths (to form two optical fibers), both optical fiber connections are advantageously offset from the center of the connector, with one of the optical fiber connections serving as a key. As in the preferred embodiment (FIGS. 2, 3, 4, 7A and 7B), each optical fiber connection would include (in both the plug and socket) an optical fiber retainer 56, rails 104, and teeth 105.

Figure 9A:
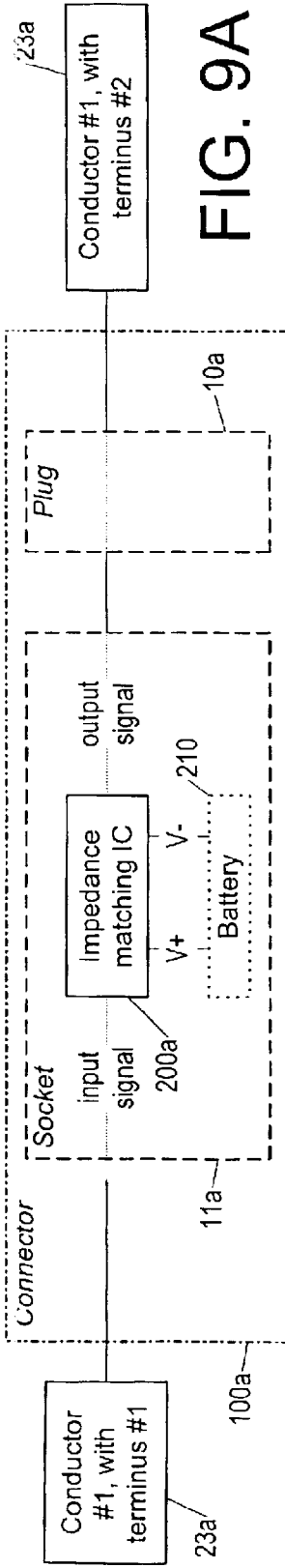
FIGS. 9A–C are block diagrams illustrating different examples of connectors according to the invention.
Figure 9B:
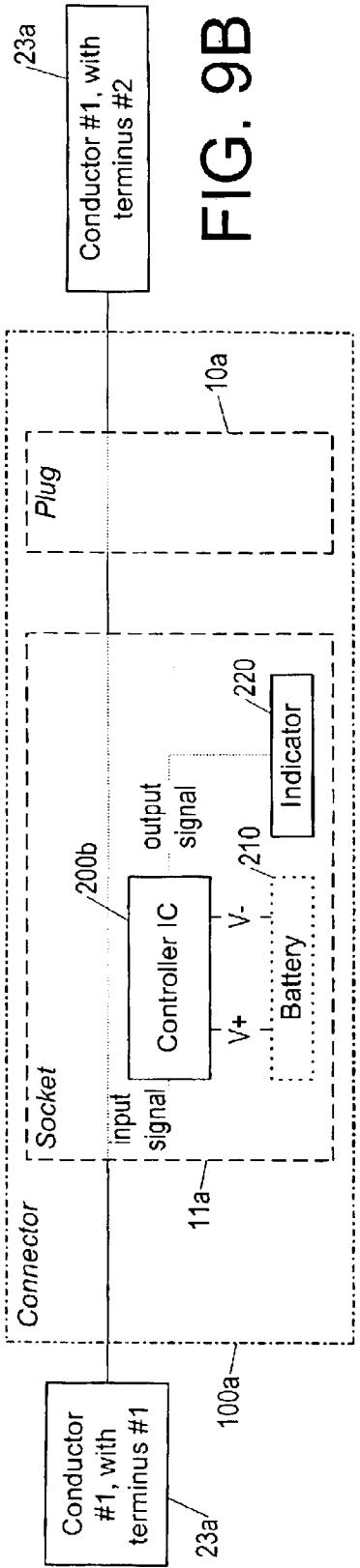
Figure 9C:
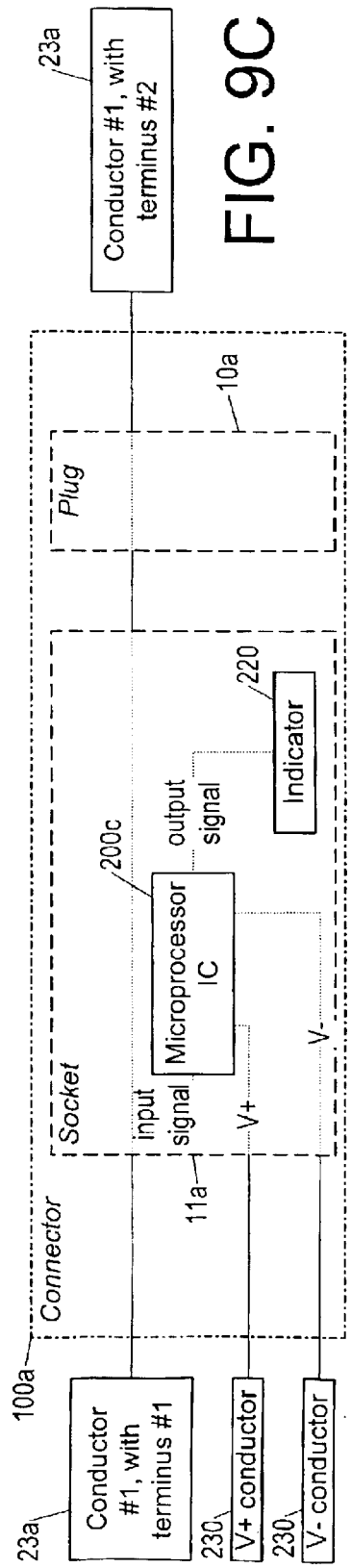

Referring now to FIGS. 9A–9C, the invention is shown as a connector 100a, for connecting ends of at least one conductor 23a suitable for conveying an electrical or an optical signal, the connector 100a having a plug end 10a and a socket end 11a to which respective ends of the conductor 23a are attached, and including one or another type of IC 200a–c disposed so as to be integral with the socket end 11a (although it is also possible for an IC to be embedded either instead or also in the plug end 10a, as illustrated in FIG 5).

Referring now in particular to the embodiment shown in FIG. 9A, an impedance matching IC 200a is embedded in the socket 11a and obtains its supply voltage from a battery 210. The impedance matching IC 200a senses the input impedance of the plug end 10a and the (input) impedance of the socket end 11a (by techniques known in the art) and adjusts its own impedance so that the combined impedance of the plug end and the impedance matching IC 200*a* is substantially equal to the (input) impedance of the socket end 11*a* (not including the impedance matching IC 200*a*). In some embodiments there may be included in the socket end 11*a* separate resistive, capacitive and inductive elements, (separate from the impedance matching IC 200*a*) that the impedance matching IC 200*a* connects into the transmission path to match the impedance of the plug end 10*a* to that of the socket end 11*a*.

Referring now in particular to the embodiment shown in FIG. 9B, a controller IC 200*b*, i.e. an IC that performs the function of a controller in one or another application, is embedded in the socket 11*a* and also obtains its supply voltage from a battery 210. The controller IC 200*b* taps the signal on the conductor 23*a* to obtain an input signal, on the basis of which it provides an output signal that is shown being applied to an indicator 220 so as to convey information about the signal on the conductor 23*a*. The indicator could be, e.g., an LED. Alternatively, the output signal could be provided to a device that performs a function upon receiving a predetermined signal. For example, the output signal could be provided to a thermostat control device that adjusts a thermostat based on the voltage of the output signal.

Referring now in particular to the embodiment shown in FIG. 9C, a general purpose microprocessor IC 200*c* is embedded in the socket 11*a*, and instead of obtaining its supply voltage from a battery 210, it does so via special supply voltage lines 230. Like the controller IC 200*b*, the microprocessor IC 200*c* taps the signal on the conductor 23*a* to obtain an input signal, on the basis of which it provides an output signal that is shown being applied to an indicator 220 so as to convey information about the signal on the conductor 23*a*. A typical microprocessor would ordinarily have several inputs, one from each of several different conductors being connected by the connector, such as the conductor 23*a*, not simply one input as shown in FIG. 9C; only a single input is shown there purely for ease of illustration. The microprocessor IC 200*c* differs from the controller IC 200*b* both in the number of inputs and in the complexity of the processing it performs. The output of the microprocessor IC 200*c* is shown again being provided to an indicator 220, as in the embodiment shown in FIG. 9B, but ordinarily the indicator being provided with an input by the microprocessor IC 200*c* would be capable of providing substantially more information than the indicator being provided with an input by the controller IC 200*b*.

As mentioned above, the invention also comprehends having an IC embedded in a splice, i.e. a connector not having a plug and a socket, but which connects two ends of a conductor by itself providing a conducting medium and by holding the two ends of the conductor in a way that makes electrical or optical contact. In such an embodiment, the IC is embedded in the splice so that when one or another of the ends of the conductor being joined are inserted into the splice, whatever contact is required between the IC and the conductor results unavoidably. For example, if the IC is inline, then by inserting into the splice the two ends of the conductor being joined by the splice, the two ends make (electrical or optical) contact with the input and output terminals of the IC. (An inline IC must of course be embedded in the splice, including being physically and electrically attached to the splice, so that the conductor being spliced includes the inline IC as the only path through which the signal being conducted can follow from one end of the spliced conductor to the other.) In splice embodiments, the power for the IC is preferably (and most simply) provided by a battery also embedded in the splice, although the power can also be provided by an external source, such as a battery not embedded in the splice or by an external power supply, or even by taps from other conductors also inserted into the splice.

As also mentioned above, the embedded IC can be for use as part of an optical circuit. For example, it can be a repeater/amplifier. Such an IC can be powered using power conveyed via an optical conductor, as indicated in FIG. 10, or power conveyed via electrical conductors, as in FIG. 11. (In FIG. 10, the IC 200 is shown powered by tapping a single optical conductor, an arrangement that would be possible for example for an IC including a photovoltaic cell, not shown, and so providing the customary V+ and V− inputs typically required by an IC.) In case of more than one optical conductor feeding to a member (either the plug or socket) of the connector, the connector illustrated in FIG. 1 can be adapted so as to connect a plurality of optical conductors, or so as to provide power in the form of light via an optical conductor terminating in one or another member of the connector, analogously to how the electrical connectors 230 of FIG. 9*c* provide power in the form of an electrical current. In addition, what is not shown but also contemplated is having an embedded IC used in connection with an electrical circuit being powered by power conveyed by optical conductors.

It is to be understood that the above-described arrangements are only illustrative of the application of the principles of the present invention. Numerous other kinds of ICs are comprehended, and numerous modifications and alternative arrangements to those described above may be devised by those skilled in the art without departing from the scope of the present invention, and the appended claims are intended to cover such other kinds of ICs, modifications and arrangements.

What is claimed is:

1. A connector (100 to 100*a*), for connecting ends of at least one pair of conductors (23 23*a*) suitable for conveying an electrical or an optical signal, comprising:

a first housing (10 10*a* 80) for receipt of at least a first of said conductors (23 23*a*); and a second housing (11 11*a*) for receipt of at least a second of said conductors (23 23*a*);

wherein the first housing (10 10*a* 80) and the second housing (11 11*a*) are adapted so as to mate one with the other either as a splice so as to be permanently connected, or by inserting one into a cavity of the other until the one slidably registers with a wall of said cavity at an advanced position, and then rotating the one within the other at the advanced position so as to cause an aligning of first contact elements (20 21 41) in the first housing and second contact elements (20 21 41) in the second housing, thereby connecting the ends of the at least one pair of conductors (23 23*a*) in the first housing and in the second housing;

and further wherein the connector (100 100*a*) also includes at least one embedded integrated circuit (200 200*a*) connected to at least one of the conductors (23 23*a*) in the at least one pair of conductors (23 23*a*).

2. The connector (100 100*a*) of claim 1, further characterized in that it also includes a battery (210) serving as a source of supply voltage for the embedded integrated circuit (200 200*a*).

3. The connector (100 100*a*) of claim 1, further characterized in that power for the embedded integrated circuit (200 200*a*) is provided by tapping at least one of the at least one conductor (23 23*a*).

4. The connector (100 100a) of claim 1, further characterized in that power for the embedded integrated circuit (200 200a) is provided by supply voltage lines (230) terminated in the connector (100 100a).

5. The connector (100 100a) of claim 1, wherein the embedded integrated circuit (200 200a) is an amplifier.

6. The connector (100 100a) of claim 1, wherein the embedded integrated circuit (200 200a) is an impedance matching circuit.

7. The connector (100 100a) of claim 1, wherein the embedded integrated circuit (200 200a) is a test and evaluation circuit for testing connectivity through the connector (100 100a).

8. The connector (100 100a) of claim 1, wherein the embedded integrated circuit (200 200a) provides a repeater function for a digital signal.

9. The connector (100 100a) of claim 1, wherein the connector (100 100a) includes an indicator (220) for displaying a signal indicating an output of the embedded integrated circuit (200 200a).

10. The connector (100 100a) of claim 1, wherein the connector (100 100a) has a plug end (10 10a 80) and a socket end (11 11a) to which respective ends of the at least one pair of conductors (23 23a) are attached, wherein the socket (11 11a) has an elongated longitudinally extending cavity formed therein as the inner surface of a shell (32), wherein the connector (100 100a) includes a plurality of longitudinally spaced mutually insulated first contact elements (41) disposed within said cavity, wherein the plug (10 10a 80) slidably registers with said cavity between advanced and retracted positions and has a leading end directed toward the base of said cavity, wherein the connector (100 100a) also includes a plurality of longitudinally spaced, mutually insulated second contact elements (20 21) disposed along said plug, means (34 36) maintaining a predetermined angular orientation between said plug (10 10a 80) and socket (11 11a) during relative sliding thereof and permitting relative rotation thereof at said plug advanced position, said first and second contact elements (20 21 41) being out of engagement at said predetermined angular orientation and in engagement upon rotation in a single predetermined sense from said predetermined angular orientation to a closed contact position.

11. The connector (100 100a) of claim 10, wherein the connector (100 100a) also includes an optical connector (55 65) comprising separable engagable collar members (51 66) and optical fiber lengths (101) coaxial with and extending to the leading end of said plug (10 10a 80) and at the base of said cavity of the socket (11 11a), said optical connector (55 65) being in a coupled condition when said plug (10 10a 80) is in its cavity advanced position.

12. The connector (100 100a) of claim 11, wherein one of said collar members (51) nests in the other of said collar members (66) when said plug (10 10a 80) is in said advanced position.

13. The connector (100 100a) of claim 11, wherein the plug (10 10a 80) and socket (11 11a) each further comprise an optical fiber retainer (56) substantially cylindrical in form, the plug optical fiber retainer (56) extending along the length of and terminating at the leading end of the plug (10 10a 80), and the socket optical fiber retainer (56) extending along the length of the socket (11 11a) to the base of the cavity, wherein each optical fiber retainer (56) comprises resiliently pliable rails (104) extending along the length of the optical fiber retainer (56), the rails so shaped and so positioned so as to exert a radial force tending to center and align the optical fiber lengths (101) so as to be coaxial with the optical fiber retainers (56).

14. The connector (100 100a) of claim 10, further comprising a plurality of longitudinally aligned sets of said longitudinally spaced second contact elements (20 21) and a corresponding plurality of longitudinally aligned sets of said first longitudinally spaced contact elements (41), wherein the peripheries of said sets of second contact elements (20 21) are of arcuate configuration extending circumferentially of the plug (10 10a 80) for less than 360° and in a straight line, lengthwise of the connector (100 100a).

15. The connector (100 100a) of claim 10, wherein said socket (11 11a) includes a well portion defined by a cylindrical wall formed in the shell (32), the inner surface thereof having longitudinally spaced recesses (40) formed therein, said first contact elements (41) being located in said recesses (40) and normally projecting above the upper edges thereof and being resiliently inwardly urged by said second contact elements (20 21) during engagement therewith, and including contacts (46) connected to said first contact elements (41) and projecting through said cylindrical wall.

16. The connector (100 100a) of claim 10, wherein said orienting means (34 36) is defined by at least one longitudinally extending groove (34 36) formed in one of said connector members (11 11a) and at least one slidably engaging protuberance (18 19) mounted on the other of said members (10 10a 80).

17. The connector (100 100a) of claim 10, further comprising mutually insulated leads (92) disposed within said plug (10 10a 80) extending through its outer end and longitudinally along the outer face of said tubular strength member (50) and connected to respective of said second contact elements (20 21).

18. The connector (100 100a) of claim 10, further comprising a contact post (86) affixed to and projecting rearwardly from said plug (10 10a 80), said tubular strength member (50) extending rearwardly through said contact post (86), a plurality of spaced terminal elements (87) mounted on said contact post (86), and mutually insulated leads (92) extending longitudinally along the outer face of said tubular strength member (50) and connecting said terminal elements (87) to respective of said second contact elements (20 21), wherein the integrated circuit (200 200a) is embedded in a housing (89) slidably disposed to cover the insulator post (86).

19. The connector (100 100a) of claim 10, further comprising separable engagable conductor collar members and conductor pin elements coaxial with and mounted at the leading end of said plug member and at the base of said cavity and defining a coaxial connector, said coaxial connector being in a couple condition when said plug is in its cavity advanced position.

20. A connector (100 100a), for connecting ends of at least one pair of conductors (23 23a) suitable for conveying an optical signal, characterized in that the connector (100 100a) also includes at least one embedded integrated circuit (200 200a) connected to at least one of the conductors (23 23a) in the at least one pair of conductors (23 23a).

* * * * *

UNITED STATES PATENT AND TRADEMARK OFFICE
CERTIFICATE OF CORRECTION

PATENT NO. : 6,773,306 B2
DATED : August 10, 2004
INVENTOR(S) : Paul J. Plishner It is certified that error appears in the above-identified patent and that said Letters Patent is hereby corrected as shown below:

Column 2,
Line 44, after "may" insert -- be --.
Line 48, delete "mat" and substitute -- may --.

Signed and Sealed this

First Day of February, 2005

JON W. DUDAS
*Director of the United States Patent and Trademark Office*